US012670871B2

(12) United States Patent
Huang

(10) Patent No.: US 12,670,871 B2
(45) Date of Patent: Jun. 30, 2026

(54) SWITCH CONTROL CIRCUIT AND BACKLIGHT DRIVER BOARD

(71) Applicant: Shenzhen China Star Optoelectronics Semiconductor Display Technology Co., Ltd., Shenzhen (CN)

(72) Inventor: Jianshun Huang, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 10 days.

(21) Appl. No.: 17/792,414

(22) PCT Filed: Jun. 29, 2022

(86) PCT No.: PCT/CN2022/102384

§ 371 (c)(1),
(2) Date: Jan. 27, 2025

(87) PCT Pub. No.: WO2023/240698

PCT Pub. Date: Dec. 21, 2023

(65) Prior Publication Data

US 2025/0182707 A1 Jun. 5, 2025

(30) Foreign Application Priority Data

Jun. 17, 2022 (CN) ........................ 202210692823.X

(51) Int. Cl.
*G09G 3/34* (2006.01)

(52) U.S. Cl.
CPC ... *G09G 3/3406* (2013.01); *G09G 2320/0247* (2013.01); *G09G 2330/025* (2013.01); *G09G 2330/04* (2013.01)

(58) Field of Classification Search
CPC .......... G09G 3/2092–2096; G09G 3/34–3426; G09G 2320/0233; G09G 2320/0247;
(Continued)

(56) References Cited

U.S. PATENT DOCUMENTS 6,404,145 B1 * 6/2002 Saito .................... G09G 3/3406 315/307
2009/0109166 A1 * 4/2009 Lee ...................... G09G 3/3426 345/102
(Continued)

FOREIGN PATENT DOCUMENTS

CN 2916689 Y 6/2007
CN 200965775 Y 10/2007
(Continued)

OTHER PUBLICATIONS

International Search Report in International application No. PCT/CN2022/102384, mailed on Jan. 4, 2023.
(Continued)

*Primary Examiner* — Keith L Crawley
(74) *Attorney, Agent, or Firm* — Nathan & Associates; Menachem Nathan

(57) ABSTRACT

The present application discloses a switch control circuit and a backlight driver board. The switch control circuit includes a voltage dividing circuit, a first transistor, and a second transistor. The voltage dividing circuit includes an input end and an output end, and the input end receives a control signal. A control electrode of the first transistor is connected with the output end, and an input electrode of the first transistor receives a power supply voltage. A control electrode of the second transistor is connected with an output electrode of the first transistor, an input electrode of the second transistor receives an input voltage, and an output electrode of the second transistor is connected with a voltage output end.

20 Claims, 3 Drawing Sheets

(58) Field of Classification Search

CPC ............................... G09G 2320/04–041; G09G 2320/0613–0653; G09G 2320/08; G09G 2330/02–04; H02M 1/14–15; H02M 3/06; H02M 3/145–1588; H05B 45/34; H05B 45/36; H05B 45/46–59; G02F 1/1336–133612

See application file for complete search history.

(56) References Cited

U.S. PATENT DOCUMENTS

| | | | | |
|---|---|---|---|---|
| 2009/0189846 | A1* | 7/2009 | Nishikawa | G09G 3/3406 345/102 |
| 2012/0217823 | A1* | 8/2012 | Shimizu | G09G 5/006 307/130 |
| 2015/0305105 | A1* | 10/2015 | Yang | H05B 47/10 315/307 |
| 2016/0140912 | A1* | 5/2016 | Im | G09G 3/003 345/690 |
| 2018/0233109 | A1* | 8/2018 | Lin | G09G 5/003 |
| 2018/0332679 | A1* | 11/2018 | Li | G09G 3/3406 |
| 2019/0340972 | A1* | 11/2019 | Hao | G09G 3/2088 |
| 2021/0005150 | A1* | 1/2021 | Wang | G09G 3/3406 |

FOREIGN PATENT DOCUMENTS

| | | | |
|---|---|---|---|
| CN | 203340194 | U | 12/2013 |
| CN | 103889118 | A | 6/2014 |
| CN | 205681300 | U | 11/2016 |
| CN | 109272949 | A | 1/2019 |
| CN | 209168711 | U | 7/2019 |
| CN | 209313809 | U | 8/2019 |
| CN | 110197643 | A | 9/2019 |
| CN | 209767685 | U | 12/2019 |
| CN | 214492776 | U | 10/2021 |
| CN | 114374314 | A | 4/2022 |
| JP | 2003348824 | A | 12/2003 |

OTHER PUBLICATIONS

Written Opinion of the International Search Authority in International application No. PCT/CN2022/102384,mailed on Jan. 4, 2023.

Chinese Office Action issued in corresponding Chinese Patent Application No. 202210692823.X dated May 1, 2024, pp. 1-8.

* cited by examiner

SWITCH CONTROL CIRCUIT AND BACKLIGHT DRIVER BOARD

CROSS-REFERENCE TO RELATED APPLICATIONS

This application is a national stage of International Application No. PCT/CN2022/102384, filed on Jun. 29, 2022, which claims priority to Chinese Patent Application No. 202210692823.X, filed to the China Patent Office on Jun. 17, 2022. The entire contents of the above applications are incorporated into this application by references.

FIELD OF INVENTION

The present application relates to a field of display technology, in particular, to a switch control circuit and a backlight driver board.

BACKGROUND

In current commercial display modules, backlight module lamps are driven and lit by backlight driver boards. Since the backlight driver board is a passive module, turning on, turning off, and a brightness of the backlight module lamps need to be controlled by external signals. Generally, when an input voltage is input to the backlight driver board, it is necessary to control the turning-on and turning-off of the backlight module lamps through a switch control circuit and a control signal.

The switch control circuit is controlled by the control signal to output the input voltage to the backlight driver board. However, because the control signal is interfered by other circuits and ripple in the circuit, a voltage value of the control signal is actually unstable. For example, when the switch control circuit is turned off, the voltage value of the control signal should be less than 0.7V, but an actual voltage value of the control signal may fluctuate between 0-1V, resulting in a logic disorder of the switch control circuit.

SUMMARY

The present application provides a switch control circuit and a backlight driver board to solve a technical problem that a circuit logic is disordered due to fluctuation of a voltage value of a control signal in an existing switch control circuit.

The present application provides a switch control circuit, comprising:

- a voltage dividing circuit, the voltage dividing circuit comprising an input end and an output end, and the input end receiving a control signal;
- a first transistor, a control electrode of the first transistor connected with the output end, and an input electrode of the first transistor receiving a power supply voltage; and
- a second transistor, a control electrode of the second transistor connected with an output electrode of the first transistor, an input electrode of the second transistor receiving an input voltage, and an output electrode of the second transistor connected with a voltage output end.

Optionally, in some embodiments of the present application, the voltage dividing circuit comprises a first voltage dividing resistor and a second voltage dividing resistor;

- an end of the first voltage dividing resistor receives the control signal, another end of the first voltage dividing resistor and an end of the second voltage dividing resistor are both connected to the output end, and another end of the second voltage dividing resistor receives the power supply voltage.

Optionally, in some embodiments of the present application, at least one of the first voltage dividing resistor and the second voltage dividing resistor is a variable resistor.

Optionally, in some embodiments of the present application, the voltage dividing circuit comprises at least one diode, an anode of the diode receives the control signal, and a cathode of the diode is connected to the output end.

Optionally, in some embodiments of the present application, the voltage dividing circuit comprises a short-circuit resistor, an end of the short-circuit resistor receives the control signal, another end of the short-circuit resistor is connected to the output end, and a resistance value of the short-circuit resistor is zero.

Optionally, in some embodiments of the present application, the switch control circuit further comprises a capacitor, a pole plate of the capacitor is connected with the output end, and another pole plate of the capacitor receives the power supply voltage.

Optionally, in some embodiments of the present application, the switch control circuit further comprises a first stabilized voltage resistor and a second stabilized voltage resistor, an end of the first stabilized voltage resistor receives the input voltage, another end of the first stabilized voltage resistor and an end of the second stabilized voltage resistor are both connected with the control electrode of the second transistor, and another end of the second stabilized voltage resistor is connected with the output electrode of the first transistor.

Optionally, in some embodiments of the present application, the switch control circuit further comprises a current limiting resistor;

- an end of the current limiting resistor is connected with the output electrode of the second transistor, and another end of the current limiting resistor is connected with the voltage output end.

Optionally, in some embodiments of the present application, the first transistor is an NPN-type triode, the second transistor is a PNP-type triode, and the power supply voltage is a ground voltage.

The present application further provides a switch control circuit, comprising:

- a voltage dividing circuit, the voltage dividing circuit comprising an input end and an output end, and the input end receiving a control signal;
- a first transistor, a control electrode of the first transistor connected with the output end, and an input electrode of the first transistor receiving a power supply voltage;
- a second transistor, a control electrode of the second transistor connected with an output electrode of the first transistor, an input electrode of the second transistor receiving an input voltage, and an output electrode of the second transistor connected with a voltage output end;
- a first stabilized voltage resistor, an end of the first stabilized voltage resistor receiving the input voltage, another end of the first stabilized voltage resistor connected with the control electrode of the second transistor;
- a second stabilized voltage resistor, an end of the second stabilized voltage resistor connected with the control electrode of the second transistor, another end of the second stabilized voltage resistor connected with the output electrode of the first transistor; and a current limiting resistor, an end of the current limiting resistor connected with the output electrode of the second transistor, another end of the current limiting resistor connected with the voltage output end.

Accordingly, the present application further provides a backlight driver board, comprising the switch control circuit as claimed in claim 1, the backlight driver board further comprising a power pin, a grounding pin, and a control pin, wherein the power pin receives the input voltage, the grounding pin receives the power supply voltage, and the control pin receives the control signal.

The present application discloses a switch control circuit and a backlight driver board. The switch control circuit comprises a voltage dividing circuit, a first transistor, and a second transistor. The voltage dividing circuit comprises an input end and an output end, and the input end receives a control signal. A control electrode of the first transistor is connected with the output end, and an input electrode of the first transistor receives a power supply voltage. A control electrode of the second transistor is connected with an output electrode of the first transistor, an input electrode of the second transistor receives an input voltage, and an output electrode of the second transistor is connected with a voltage output end. By adding the voltage dividing circuit in the switch control circuit, the present application can realize that a voltage specification of the control signal in the switch control circuit can be adjusted to meet requirements of different specifications, so as to avoid circuit logic disorder caused by a voltage fluctuation of the control signal. Furthermore, when the switch control circuit is applied to a backlight driver board, the backlight driver board can effectively control the closing of the driving backlight module to avoid a problem of flickering of the backlight module.

BRIEF DESCRIPTION OF DRAWINGS

The technical scheme and other beneficial effects of the present invention will be apparent through the detailed description of the specific embodiments of the present invention in combination with accompanying drawings.

DETAILED DESCRIPTION

In the following, the technical scheme in the embodiment of the present application will be described clearly and completely in combination with the drawings. Obviously, the described embodiments are only a part of the embodiments of the present application, rather than all the embodiments. Based on the embodiments of the present application, all other embodiments obtained by those skilled in the art without creative work fall within the protection scope of the present application.

In the description of the present application, it should be understood that the terms "first" and "second" are only used for descriptive purposes and cannot be understood as indicating or implying relative importance or implicitly indicating the number of indicated technical features. Thus, the features defining "first" and "second" may explicitly or implicitly comprise one or more of the features. Therefore, it cannot be understood as a limitation on the present application. In addition, it should be noted that unless otherwise specified and limited, the terms "connection" should be understood in a broad sense, for example, it can be mechanical connection or electrical connection; it can be directly connected or indirectly connected through an intermediate medium, and it can be the connection between two components. For those skilled in the art, the specific meaning of the above terms in the present invention can be understood in specific circumstances.

The present application provides a switch control circuit and a backlight driver board described in detail below. It should be noted that the order of description of the following embodiments does not limit the preferred order of the embodiments of the present application.

Figure 1:
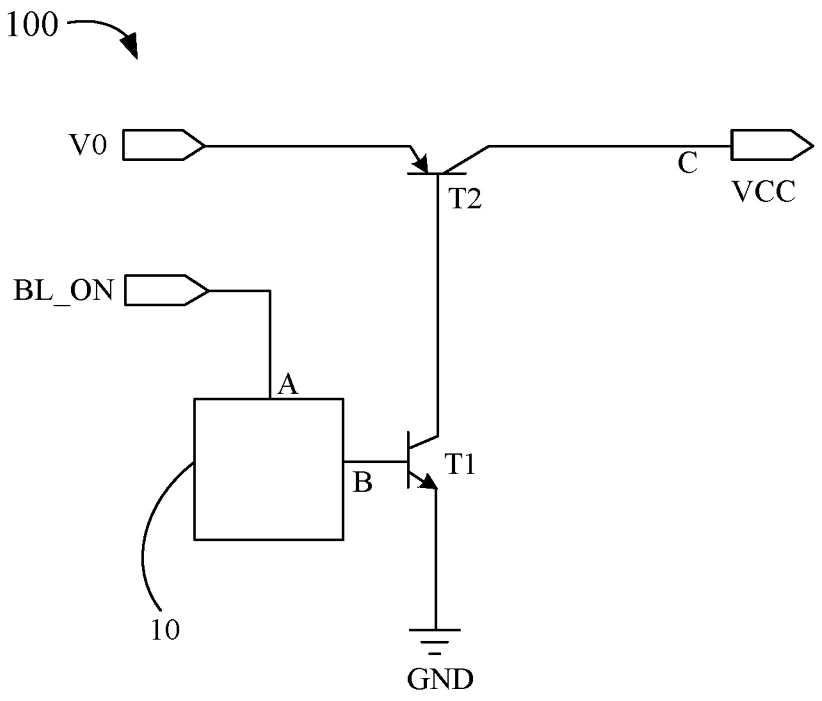
FIG. 1 is a schematic structural diagram of a switch control circuit provided by the present application.

Refer to FIG. 1, FIG. 1 is a schematic structural diagram of a switch control circuit provided by the present application. In the embodiments of the present application, the switch control circuit 100 comprises a voltage dividing circuit 10, a first transistor T1, and a second transistor T2.

The voltage dividing circuit 10 comprises an input end A and an output end B. The input end A receives a control signal BL_ON. A control electrode of the first transistor T1 is connected to the output end B. An input electrode of the first transistor T1 receives a power supply voltage. A control electrode of the second transistor T2 is connected with an output electrode of the first transistor T1. An input electrode of the second transistor T2 receives an input voltage V0. An output electrode of the second transistor T2 is connected with a voltage output end C.

Wherein the voltage output end C is used to output a working voltage VCC to a load connected with the switch control circuit 100 to drive the load to work, which will not be repeated here.

It can be understood that in a switch control circuit without the voltage dividing circuit 10, the control signal BL_ON directly controls turning on and turning off of the first transistor T1, and then controls turning on and turning off of the second transistor T2. When a voltage of the control signal BL_ON fluctuates, it is easy to cause disorder in the turning on and turning off of the first transistor T1, resulting in logic disorder in the switch control circuit 100 and affecting a normal output of the working voltage VCC.

In the embodiments of the present application, the voltage dividing circuit 10 is added to the switch control circuit 100. Since a turning-on voltage and a turning-off voltage of the control electrode of the first transistor T1 are both constant, a voltage value of the control signal BL_ON required for the turning-off of the first transistor T1 can be adjusted through a voltage dividing principle of the voltage dividing circuit 10. Thus, a voltage specification of the control signal BL_ON in the switch control circuit 100 can be adjusted to meet different specification requirements, thereby avoiding a circuit logic disorder caused by the voltage value fluctuation of the control signal BL_ON. When the switch control circuit 100 is applied to a backlight driver board, the backlight driver board can effectively control the turning-off of the driving backlight module to avoid a problem of flickering of the backlight module.

In the embodiments of the present application, transistors in the switch control circuit 100 can be one or more of a low-temperature polysilicon thin film transistor, an oxide semiconductor thin film transistor, or an amorphous silicon thin film transistor.

The transistors used in the embodiments of the present application can comprise P-type transistors and/or N-type transistors; wherein the P-type transistor turns on when the gate electrode is at a low level and turns off when the gate electrode is at a high level; and the N-type transistor turns on when the gate electrode is at the high level and turn off when the gate electrode is at the low level.

In the embodiments of the present application, the power supply voltage can be a high-level voltage or a ground voltage GND. The first transistor T1 can be the N-type transistor or the P-type transistor, and the second transistor T2 can be the N-type transistor or the P-type transistor, which can be set according to voltage values of the power supply voltage and the input voltage V0.

It should be noted that the following embodiments of the present application take the power supply voltage as the ground voltage GND, the first transistor T1 as an NPN-type triode, and the second transistor T2 as a PNP-type triode as examples, but this cannot be understood as a limitation of the present application. When the first transistor T1 is the NPN-type triode and the second transistor T2 is the PNP-type triode, the control electrode of the transistor in the embodiments of the present application is a base electrode of a triode, the input electrode of the transistor is an emitter electrode of the triode, and the output electrode of the transistor is a collector electrode of the triode.

When the control signal BL_ON is at a high level, the first transistor T1 is turned on through a voltage dividing action of the voltage dividing circuit 10, the emitter electrode and the collector electrode of the first transistor T1 are connected, the ground voltage GND is transmitted to the base electrode of the second transistor T2, the base electrode of the second transistor T2 is pulled to the low level, and the emitter electrode and the collector electrode of the second transistor T2 are connected, so that the working voltage VCC is output. Normally, a voltage value of the input voltage V0 is equal to a voltage value of the working voltage VCC.

On the contrary, when the control signal BL_ON is at the low level, both the first transistor T1 and the second transistor T2 are in the turned-off state, and the input voltage V0 cannot be output through the second transistor T2. That is, the switch control circuit 100 cannot output the working voltage VCC to the load.

Figure 2:
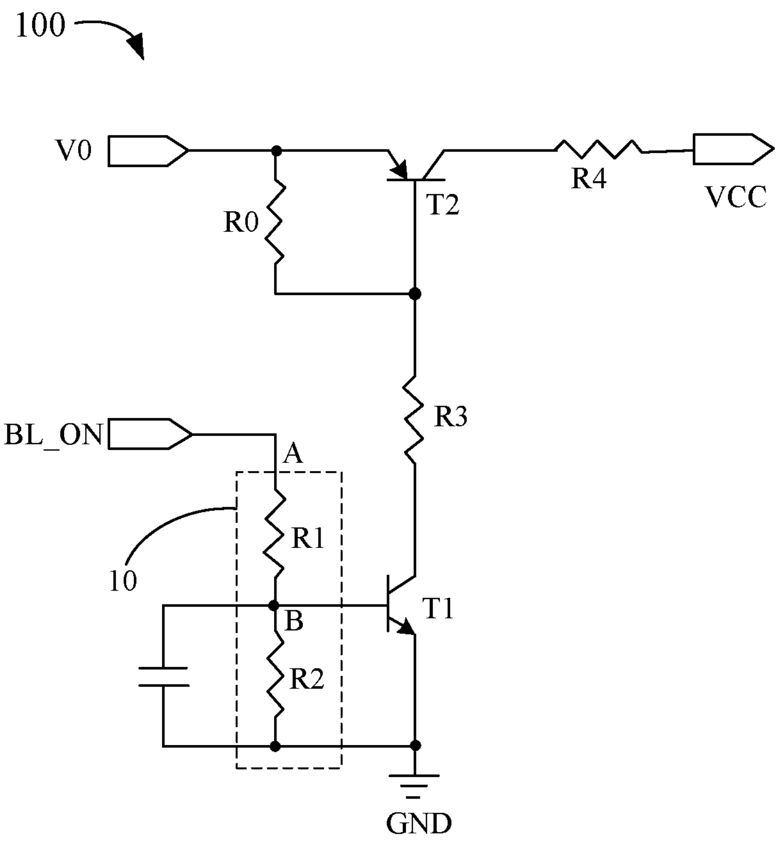
FIG. 2 is a schematic diagram of a first circuit structure of the switch control circuit provided by the present application.

Refer to FIG. 2, FIG. 2 is a schematic diagram of a first structure of the switch control circuit provided by the present application. In the embodiments of the present application, the voltage dividing circuit 10 comprises a first voltage dividing resistor R1 and a second voltage dividing resistor R2.

Wherein, an end of the first voltage dividing resistor R1 receives the control signal BL_ON. Another end of the first voltage dividing resistor R1 and an end of the second voltage dividing resistor R2 are both connected with the output end B. Another end of the second voltage dividing resistor R2 receives the power supply voltage, that is, receives the ground voltage GND.

In the embodiments of the present application, a design of resistor voltage division is adopted, and the first voltage division resistor R1 and the second voltage division resistor R2 are both used for voltage division sampling, then $V_{BL\_ON}/(R1+R2)-V_B/R2$, wherein $V_{BL\_ON}$ is the voltage value of the control signal BL_ON; the output end B is the base electrode of the first transistor T1, and $V_B$ is a voltage value of the base electrode of the first transistor T1. If a turn-on voltage of the first transistor T1 is 0.7V, $V_B=0.7V$, $V_{BL\_ON}=(1+R1/R2)*0.7V$. Therefore, a voltage specification of the control signal BL_ON can be adjusted by adjusting resistance values of the first voltage dividing resistor R1 and the second voltage dividing resistor R2.

For example, when the first voltage dividing resistor R1 is 10 kΩ and the second voltage dividing resistor R2 is 20 kΩ, $V_{BL\_On}=1.05V$, that is, the voltage value of the control signal BL_ON needs to reach 1.05V to turn on the first transistor T1. Even if an actual voltage value of the control signal BL_ON fluctuates between 0-1V due to interferences by other circuits and ripples, the first transistor T1 cannot be turned on, and there will be no circuit logic disorder.

In some embodiments of the present application, at least one of the first voltage dividing resistor R1 and the second voltage dividing resistor R2 is a variable resistor.

It can be understood that when the first transistor T1 is of different types, turn-on voltages of the first transistor T1 can be different, and when the switch control circuit 100 is applied to different chips or circuit boards, interferences on the control signal BL_ON can also be different. Therefore, the required control signal BL_ON can be adjusted by adjusting the resistance value of at least one of the first voltage dividing resistor R1 and the second voltage dividing resistor R2 to avoid circuit logic disorder.

Specifically, positions and routes for soldering the first voltage dividing resistor R1 and the second voltage dividing resistor R2 can be reserved in the voltage dividing circuit 10 to solder resistors of corresponding specifications as required. In addition, the resistors can be replaced according to application scenarios of the switch control circuit 100 to adjust the resistance value of each resistor. The operation is very convenient and concise.

Of course, in other embodiments of the present application, at least one of the first voltage dividing resistor R1 and the second voltage dividing resistor R2 can also be arranged as a sliding variable resistor, so as to change the resistance values of the first voltage dividing resistor R1 and the second voltage dividing resistor R2, which will not be repeated here.

Optionally, in some embodiments of the present application, the switch control circuit 100 further comprises a capacitor C, and a pole plate of the capacitor C is connected with the output end B. Another pole plate of the capacitor C receives the power supply voltage, that is, receives the ground voltage GND.

In some embodiments of the present application, the switch control circuit 100 further comprises a first stabilized voltage resistor R0 and a second stabilized voltage resistor R3. An end of the first stabilized voltage resistor R0 receives the input voltage V0. Another end of the first voltage stabilized voltage resistor R0 and an end of the second voltage stabilized voltage resistor R3 are both connected with the control electrode of the second transistor T2. Another end of the second voltage stabilized voltage resistor R3 is connected with the output electrode of the first transistor T1.

Wherein when the first transistor T1 is in the turned-off state, the input voltage V0 connected to the input electrode of the second transistor T2 may already be a high potential. The second transistor T2 can be in the turned-on state by mistake. Therefore, by arranging the first voltage stabilized voltage resistor R0 in the embodiments of the present application, the emitter electrode and the base electrode of the second transistor T2 can be at a definite potential, that is, same high and same low. When the first transistor T1 is turned off, the second transistor T2 can be prevented from being turned off by mistake due to a voltage difference between the emitter electrode and the base electrode of the second transistor T2.

In addition, when the first transistor T1 is turned on, a loop is formed between the input voltage V0, the first stabilized voltage R0, the second stabilized voltage R3, the first transistor T1, and the ground voltage GND. By controlling resistance values of the first stabilized voltage resistor R0 and the second stabilized voltage resistor R3, the voltage difference between the emitter electrode and the base electrode of the second transistor T2 can be controlled, and then the second transistor T2 can be controlled to turn on to realize a normal output of the working voltage VCC.

In some embodiments of the present application, the switch control circuit 100 can also comprise a current limiting resistor R4. An end of the current limiting resistor R4 is connected with the output electrode of the second transistor T2. Another end of the current limiting resistor R4 is connected to the voltage output end C.

In the embodiments of the present application, the current limiting resistor R4 plays a current limiting role in the switch control circuit 100 to prevent an output current of the switch control circuit 100 from being too large and burning the load connected to the voltage output end C. Wherein the current limiting resistor R4 does not play a role of voltage division, that is, under ideal conditions, the voltage value of the input voltage V0 is equal to the voltage value of the working voltage VCC. A resistance value of the current limiting resistor R4 can be designed according to actual demand, which is not specifically limited in the present application.

Figure 3:
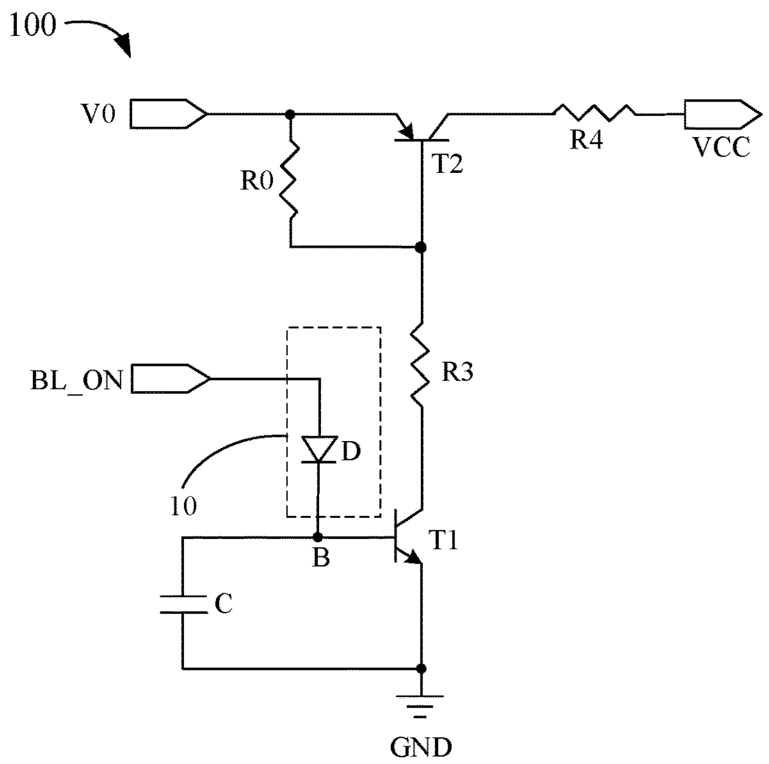
FIG. 3 is a schematic diagram of a second circuit structure of the switch control circuit provided by the present application.

Refer to FIG. 3, FIG. 3 is a schematic diagram of a second circuit structure of the switch control circuit provided by the present application. A difference from the switch control circuit 100 shown in FIG. 2 is that, in the embodiments of the present application, the voltage dividing circuit 10 comprises at least one diode D. an anode of the diode D receives the control signal BL_ON. A cathode of the diode D is connected with the output end B.

It can be understood that the diode D has a turn-on voltage. Therefore, the diode D is arranged in the voltage dividing circuit 10, that is, the diode D connected in series between the control signal BL_ON and the control electrode of the first transistor T1, which can act as a voltage divider. Similarly, taking the turn-on voltage of the first transistor T1 as 0.7, $V_{BL\_ON}=V_B+0.7=1.4V$. The voltage value of the control signal BL_ON needs to reach 1.4V to turn on the first transistor T1. Even if the actual voltage value of the control signal BL_ON fluctuates between 0-1V due to the interference of other circuits and ripples, the first transistor T1 cannot be turned on, and there will be no circuit logic disorder.

Wherein when the voltage dividing circuit 10 comprises two or more diodes D, the two or more diodes D are arranged in series, so that voltage input specification of the control signal BL_ON can be further adjusted.

Figure 4:
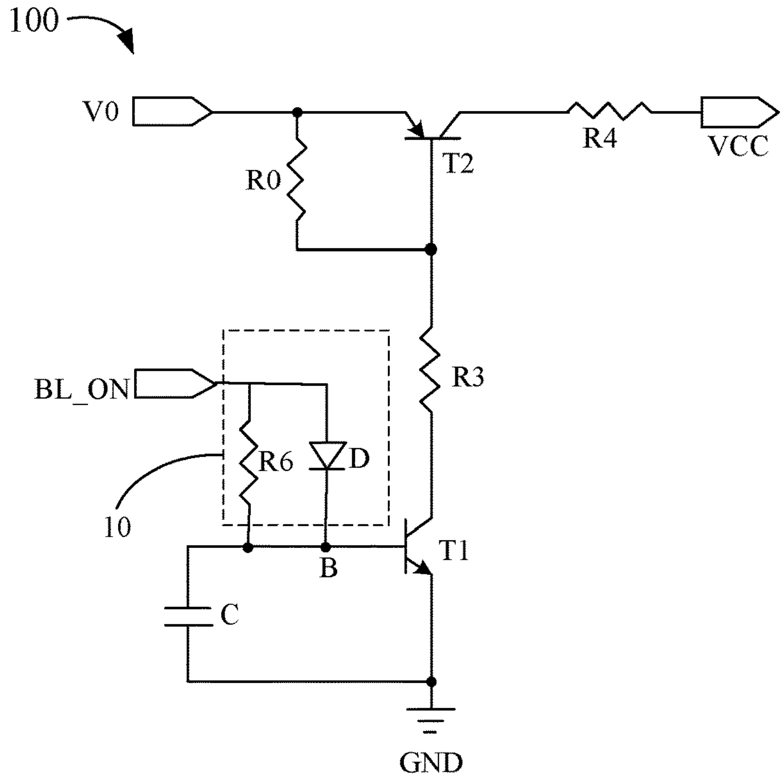
FIG. 4 is a schematic diagram of a third circuit structure of the switch control circuit provided by the present application.

Further, please refer to FIG. 4, FIG. 4 is a schematic diagram of a third circuit structure of the switch control circuit provided by the present application. A difference from the switch control circuit 100 shown in FIG. 3 is that in some embodiments of the present application, the voltage dividing circuit 10 further comprises a short-circuit resistor R6. An end of the short-circuit resistor R6 receives the control signal BL_ON. Another end of short-circuit resistor R6 is connected to the output end B, and a resistance value of the short-circuit resistor R6 is zero.

It can be understood that resistance soldering sites can be reserved in the voltage dividing circuit 10. When the actual voltage value of the control signal BL_ON is within a small fluctuation range, the short-circuit resistor R6 can be soldered onto the voltage dividing circuit 10. At this time, the short-circuit resistor R6 will short circuit the diode D, and the diode D will no longer play the role of voltage dividing. Similarly, taking the turn-on voltage of the first transistor T1 as 0.7, $V_{BL\_ON}=0.7V$, the specification of the control signal BL_ON can be adjusted to be less than 0.7V.

Figure 5:
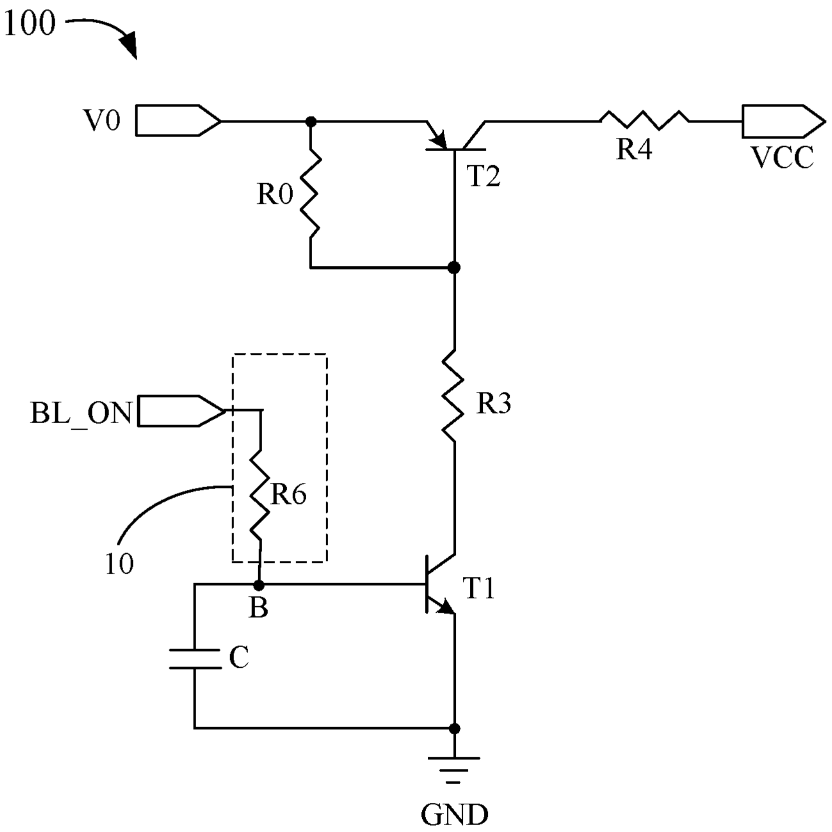
FIG. 5 is a schematic diagram of a fourth circuit structure of the switch control circuit provided by the present application.

Of course, in some embodiments of the present application, only the short-circuit resistor R6 can be installed in the switch control circuit 100, not the diode D. For details, please refer to FIG. 5, FIG. 5 is a schematic diagram of a fourth circuit structure of the switch control circuit provided by the present application. A difference from the switch control circuit 100 shown in FIG. 4 is that the voltage dividing circuit 10 only comprises a short-circuit resistor R6.

It can be understood that, if according to a demand, when the first transistor T1 is turned off, the voltage specification of the control signal BL_ON is only 0-0.6V, then only the short-circuit resistor R6 is installed, not the diode D, so as to reduce production cost.

Figure 6:
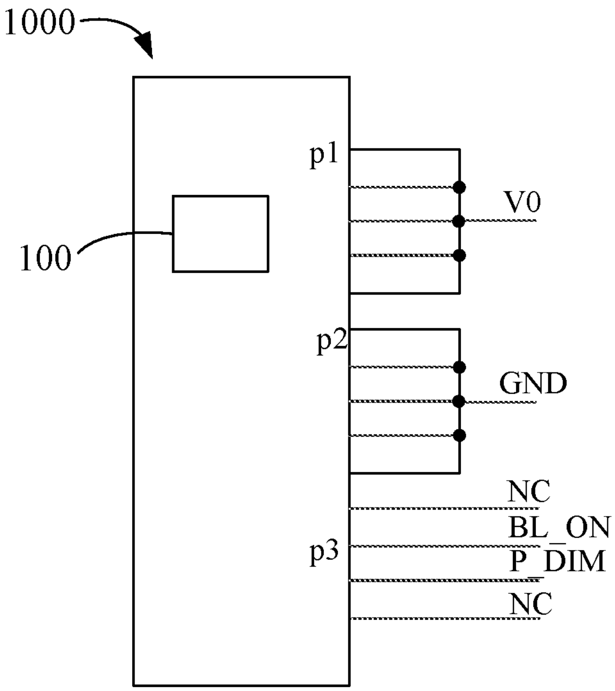
FIG. 6 is a schematic structural diagram of a backlight driver board provided by the present application.

Accordingly, please refer to FIG. 6, FIG. 6 is a schematic structural diagram of a backlight driver board provided by the present application. In the embodiments of the present application, the backlight driver board 1000 comprises the switch control circuit 100 described in any of the above embodiments. For details, please refer to FIGS. 1 to 5 and the above embodiments and will not be repeated here.

The backlight driver board 1000 further comprises a power pin p1, a grounding pin p2, and a control pin p3. The power pin p1 receives the input voltage V0. The grounding pin p2 receives the ground voltage GND. The control pin p3 receives the control signal BL_ON.

Wherein the input end of the voltage dividing circuit 10 is connected with the control pin p3. The input electrode of the first transistor T1 is connected with the grounding pin p2. The input electrode of the second transistor T2 is connected with the power pin p1. The backlight driver board 1000 controls a turn-on or a turn-off of the backlight module lamp under a control of the externally outputted input voltage V0, the ground voltage GND, the control signal BL_ON, and the switch control circuit 100.

In addition, other pins of the backlight driver board 1000 can also receive a light emission control signal P_DIM to control a light-emitting duration of the backlight module lamp, which is a technology well known to those skilled in the art and will not be repeated here. The backlight driver board 1000 also comprises some pins that are not connected to signals, such as pin NC, which will not be described here.

The backlight driver board 1000 provided by the embodiments of the present application comprises the switch control circuit 100, and the voltage dividing circuit 10 is added to the switch control unit 100. Since the turn-on voltage and the turn-off voltage of the control electrode of the first transistor T1 are both constant, the voltage value of the control signal BL_ON required for the turning off of the first transistor T1 can be adjusted through the voltage dividing principle of the voltage dividing circuit 10. Thus, the voltage input specification of the control signal BL_ON in the switch control circuit can be adjusted to meet different specification requirements, thereby avoiding a circuit logic disorder caused by the voltage value fluctuation of the control signal BL_ON, and the backlight driver board 1000 can effectively control the turning off of the driving backlight module to avoid the problem of the backlight module flickering.

A switch control circuit and a backlight driver board are described in detail above. And in this paper, specific examples are applied to explain the principle and implementation mode of the application. The above embodiments are only examples of the implementation of the present invention. Those of ordinary skill in the art should understand that they can still modify the technical scheme recorded in the above embodiments, or equivalent replace some of the technical features. These modifications or substitutions do not separate the essence of the corresponding technical scheme from the scope of the technical scheme of each embodiment of the present invention.

What is claimed is:

1. A switch control circuit, comprising:

a voltage dividing circuit, the voltage dividing circuit having an input end and an output end, and the input end receiving a control signal;

a first transistor, a control electrode of the first transistor connected with the output end, and an input electrode of the first transistor receiving a power supply voltage; and a second transistor, a control electrode of the second transistor connected with an output electrode of the first transistor, an input electrode of the second transistor receiving an input voltage, and an output electrode of the second transistor connected with a voltage output end;

wherein the voltage dividing circuit comprises at least one diode, an anode of the diode is configured to receive the control signal, and a cathode of the diode is connected to the output end; and wherein the control signal is configured to control the voltage output end of the switch control circuit to output a working voltage, and the switch control circuit is configured to control a backlight driver board that comprises the switch control circuit to selectively turn on or turn off a backlight module.

2. The switch control circuit according to claim 1, wherein the voltage dividing circuit further comprises a short-circuit resistor, an end of the short-circuit resistor receives the control signal, another end of the short-circuit resistor is connected to the output end, and a resistance value of the short-circuit resistor is zero.

3. The switch control circuit according to claim 1, wherein the switch control circuit further comprises a capacitor, a pole plate of the capacitor is connected with the output end, and another pole plate of the capacitor receives the power supply voltage.

4. The switch control circuit according to claim 1, wherein the switch control circuit further comprises a first stabilized voltage resistor and a second stabilized voltage resistor, an end of the first stabilized voltage resistor receives the input voltage, another end of the first stabilized voltage resistor and an end of the second stabilized voltage resistor are both connected with the control electrode of the second transistor, and another end of the second stabilized voltage resistor is connected with the output electrode of the first transistor.

5. The switch control circuit according to claim 1, wherein the switch control circuit further comprises a current limiting resistor:

wherein an end of the current limiting resistor is connected with the output electrode of the second transistor, and another end of the current limiting resistor is connected with the voltage output end.

6. The switch control circuit according to claim 1, wherein the first transistor is an NPN-type triode, the second transistor is a PNP-type triode, and the power supply voltage is a ground voltage.

7. A switch control circuit, comprising:

a voltage dividing circuit, the voltage dividing circuit having an input end and an output end, and the input end receiving a control signal;

a first transistor, a control electrode of the first transistor connected with the output end, and an input electrode of the first transistor receiving a power supply voltage;

a second transistor, a control electrode of the second transistor connected with an output electrode of the first transistor, an input electrode of the second transistor receiving an input voltage, and an output electrode of the second transistor connected with a voltage output end;

a first stabilized voltage resistor, an end of the first stabilized voltage resistor receiving the input voltage, another end of the first stabilized voltage resistor connected with the control electrode of the second transistor;

a second stabilized voltage resistor, an end of the second stabilized voltage resistor connected with the control electrode of the second transistor, another end of the second stabilized voltage resistor connected with the output electrode of the first transistor; and a current limiting resistor, an end of the current limiting resistor connected with the output electrode of the second transistor, another end of the current limiting resistor connected with the voltage output end;

wherein the voltage dividing circuit comprises a short-circuit resistor, an end of the short-circuit resistor is configured to receive the control signal, another end of the short-circuit resistor is connected to the output end, and a resistance value of the short-circuit resistor is zero; and wherein the control signal is configured to control the voltage output end of the switch control circuit to output a working voltage, and the switch control circuit is configured to control a backlight driver board that comprises the switch control circuit to selectively turn on or turn off a backlight module.

8. The switch control circuit according to claim 7, wherein the voltage dividing circuit further comprises at least one diode, an anode of the diode receives the control signal, and a cathode of the diode is connected to the output end.

9. The switch control circuit according to claim 7, wherein the switch control circuit further comprises a capacitor, a pole plate of the capacitor is connected with the output end, and another pole plate of the capacitor receives the power supply voltage.

10. The switch control circuit according to claim 7, wherein the first transistor is an NPN-type triode, the second transistor is a PNP-type triode, and the power supply voltage is a ground voltage.

11. A backlight driver board, comprising the switch control circuit as claimed in claim 1, the backlight driver board further comprising a power pin, a grounding pin, and a control pin, the power pin receives the input voltage, the grounding pin receives the power supply voltage, and the control pin receives the control signal.

12. The backlight driver board according to claim 11, wherein the voltage dividing circuit further comprises a short-circuit resistor, an end of the short-circuit resistor receives the control signal, another end of the short-circuit resistor is connected to the output end, and a resistance value of the short-circuit resistor is zero.

13. The backlight driver board according to claim 11, wherein the switch control circuit further comprises a capacitor, a pole plate of the capacitor is connected with the output end, and another pole plate of the capacitor receives the power supply voltage.

14. The backlight driver board according to claim 11, wherein the switch control circuit further comprises a first stabilized voltage resistor and a second stabilized voltage resistor, an end of the first stabilized voltage resistor receives the input voltage, another end of the first stabilized voltage resistor and an end of the second stabilized voltage resistor are both connected with the control electrode of the second transistor, and another end of the second stabilized voltage resistor is connected with the output electrode of the first transistor.

15. The backlight driver board according to claim 11, wherein the switch control circuit further comprises a current limiting resistor:

wherein an end of the current limiting resistor is connected with the output electrode of the second transistor, and another end of the current limiting resistor is connected with the voltage output end.

16. The backlight driver board according to claim 11, wherein the first transistor is an NPN-type triode, the second transistor is a PNP-type triode, and the power supply voltage is a ground voltage.

17. A backlight driver board, comprising the switch control circuit as claimed in claim 7, the backlight driver board further comprising a power pin, a grounding pin, and a control pin, the power pin receives the input voltage, the grounding pin receives the power supply voltage, and the control pin receives the control signal.

18. The backlight driver board according to claim 17, wherein the voltage dividing circuit further comprises at least one diode, an anode of the diode receives the control signal, and a cathode of the diode is connected to the output end.

19. The backlight driver board according to claim 17, wherein the switch control circuit further comprises a capacitor, a pole plate of the capacitor is connected with the output end, and another pole plate of the capacitor receives the power supply voltage.

20. The backlight driver board according to claim 17, wherein the first transistor is an NPN-type triode, the second transistor is a PNP-type triode, and the power supply voltage is a ground voltage.

* * * * *